(12) United States Patent
Yoshimura et al.

(10) Patent No.: US 11,938,534 B2
(45) Date of Patent: *Mar. 26, 2024

(54) DEVICE FOR OPENING/CLOSING (71) Applicant: KROSAKIHARIMA CORPORATION, Fukuoka (JP)

(72) Inventors: Mamoru Yoshimura, Fukuoka (JP); Junichi Funato, Fukuoka (JP); Yusuke Yamaguchi, Fukuoka (JP); Toshihiro Imahase, Fukuoka (JP)

(73) Assignee: KROSAKIHARIMA CORPORATION, Fukuoka (JP)

( * ) Notice: Subject to any disclaimer, the term of this patent is extended or adjusted under 35 U.S.C. 154(b) by 134 days.

This patent is subject to a terminal disclaimer.

(21) Appl. No.: 17/295,190

(22) PCT Filed: Mar. 19, 2020

(86) PCT No.: PCT/JP2020/012312
§ 371 (c)(1),
(2) Date: May 19, 2021

(87) PCT Pub. No.: WO2020/196270
PCT Pub. Date: Oct. 1, 2020

(65) Prior Publication Data
US 2022/0016695 A1 Jan. 20, 2022

(30) Foreign Application Priority Data

Mar. 27, 2019 (JP) .................. 2019-061258

(51) Int. Cl.
B22D 11/10 (2006.01)
B22D 41/34 (2006.01)
B25J 13/08 (2006.01)

(52) U.S. Cl.
CPC .............. B22D 11/10 (2013.01); B22D 41/34 (2013.01); B25J 13/08 (2013.01)

(58) Field of Classification Search
CPC ...................................................... B22D 41/34
See application file for complete search history.

(56) References Cited

U.S. PATENT DOCUMENTS 11,135,646 B2 * 10/2021 Imahase ................ B22D 41/28
2011/0062193 A1 3/2011 Sadano
(Continued)

FOREIGN PATENT DOCUMENTS

JP           2744458 B2 *  4/1998
WO    2009/119824 A1    10/2009
WO    2018/074424 A1     4/2018

OTHER PUBLICATIONS

International Preliminary Report on Patentability dated Sep. 28, 2021 and Written Opinion for PCT/JP2020/012312 filed Mar. 19, 2020 (English translation).
(Continued)

Primary Examiner — Scott R Kastler
(74) Attorney, Agent, or Firm — Paul D. Bianco; Fleit Intellectual Property Law (57) ABSTRACT An opening-closing apparatus capable of, when using a robot arm to selectively open and close a component of a sliding nozzle device, reliably opening and closing the component to respective given positions. The apparatus comprises: a hand-like distal module engageable with an openable-closable component of a sliding nozzle device; a force sensor to detect a force received by the module; and a robot arm to which the module and the sensor are mounted. The robot arm is controllably operated to: move the module toward the component of the sliding nozzle device and engage the module with the component of the sliding nozzle device; then move the module to move the component, if the absolute value of the force detected by the sensor is equal to or less than a given threshold; and stop the movement of the
(Continued)

module, when the absolute value of the force detected by the sensor reaches the threshold.

6 Claims, 7 Drawing Sheets

(56) References Cited

U.S. PATENT DOCUMENTS

| | | | |
|---|---|---|---|
| 2020/0038944 A1 | 2/2020 | Toshihiro | |
| 2022/0016695 A1* | 1/2022 | Yoshimura | B25J 15/00 |
| 2022/0097129 A1* | 3/2022 | Yoshimura | B22D 41/24 |

OTHER PUBLICATIONS

International Search Report, dated Apr. 1, 2020, and Written Opinion for PCT/JP2020/012312 filed Mar. 19, 2020.

* cited by examiner

A DEVICE FOR OPENING/CLOSING

TECHNICAL FIELD

The present invention relates to an opening-closing apparatus for selectively opening and closing an openable-closable component of a sliding nozzle device used for control of the flow rate of molten metal.

BACKGROUND ART

A sliding nozzle device for use in a ladle or a tundish is composed using two or three refractory plates, each of which is attached to a respective one of two or three plate-receiving metal frames. When these plates reach the end of their life due to wear damage, it is necessary to open the sliding nozzle device to take out the old plates from respective ones of the plate-receiving metal frames, and replace the old plates with new ones. This replacement operation imposes a heavy burden on an operator, because it has to be performed under high temperature, and the weight of the plate, particularly heavy ones, is close to 30 kg.

Therefore, in recent years, it has been studied to perform the plate replacement operation using a robot arm. For example, one of the present inventors disclosed, in the below-mentioned Patent Document 1, a plate holding apparatus capable of holding a plate in a state in which it is attached to a balancer or a robot arm. In a case where this plate holding apparatus is attached to a robot arm to perform the plate replacement operation, it is desired, from a viewpoint of further reducing the burden on an operator, etc., to also perform, by the robot arm, operation of selectively opening and closing an openable-closable component of the sliding nozzle device, such as a slide metal frame in which a sliding plate is received, a slide metal frame holding unit for holding the slide metal frame, or a spring box for applying a surface pressure.

Meanwhile, in an iron foundry, the sliding nozzle device is attached to the bottom of a molten steel pot such as a ladle or a tundish. Thus, when detaching a used plate, the plate assembled to the sliding nozzle device has to be detached from the side of the bottom of the molten steel pot in a state in which the molten steel pot is laid down. In this case, the molten steel pot is laid down by manipulating a crane. However, since the crane is manually manipulated, the laid-down position of the molten steel pot will vary by, e.g., several centimeters, each time.

Thus, in order to allow the aforementioned opening-closing operation for the openable-closable component of the sliding nozzle device to be performed under position control of the robot arm, the position of the sliding nozzle device has to be accurately measured each time. In recent years, measurement of the position of an object during use of the robot arm has been commonly performed, using of a technique of acquiring an image of the object by a camera, and subjecting the acquired image to image processing, thereby correcting positional coordinates of the object. However, with regard to the sliding nozzle device, it has been found that, in the image processing, there is a problem that a measurement accuracy in a front-rear direction (distance) becomes poor, although measurement accuracies in an up-down direction and in a right-left direction are at a practical level.

This is because the image is acquired during a drop in temperature of the sliding nozzle device just after being used at high temperature, so that the size of an image-acquisition reference area of the sliding nozzle device varies each image-acquisition due to thermal expansion, thereby an error in positional coordinates, particularly, in the front-rear direction (distance) is more likely to arise. Further, if undulation, flaw, adhesion of foreign substances or the like occurs in the image-acquisition reference area during use of the sliding nozzle device, it also becomes a factor causing an error in the image processing.

If a measurement error arises in the distance between the sliding nozzle device and the robot arm, the opening-closing operation for the openable-closable component of the sliding nozzle device is likely to become unable to be properly performed. For example, if the slide metal frame becomes unable to be opened to a given position, a problem will arise that, when taking out a plate by the robot arm in the next step, the slide metal frame is pushed and displaced, and thereby the plate becomes unable to be gripped by the robot arm. On the other hand, if the slide metal frame is not completely closed, a problem will arise that a surface pressure becomes unable to be applied in the next step.

As above, it has been found that, since the sliding nozzle device is used under a very severe condition that it receives radiation heat of molten steel having a temperature of 1500° C. or more, while holding the plates through which the high-temperature molten steel passes, and is exposed to splash of the molten steel, and dust, the conventional position measurement technique has a problem of poor measurement accuracy in distance.

CITATION LIST

Parent Document

Patent Document 1: WO-A 2018/074424

SUMMARY OF INVENTION

Technical Problem

A problem to be solved by the present invention is to provide an opening-closing apparatus capable of selectively opening and closing an openable-closable component of a sliding nozzle device to respective given positions in a reliable manner.

Solution to Technical Problem

The present invention provides an opening-closing apparatus having the following features.

1. An opening-closing apparatus for selectively opening and closing an openable-closable component of a sliding nozzle device, which comprises: a hand-like distal module configured to be engaged with the openable-closable component of the sliding nozzle device; a force sensor configured to detect a force received by the hand-like distal module; and a robot arm to which the hand-like distal module and the force sensor are mounted.

2. The opening-closing apparatus as set forth in the section 1, wherein the hand-like distal module is configured to be engaged with the openable-closable component of the sliding nozzle device, in a state in which the hand-like distal module is freely fitted around a portion of the openable-closable component with a gap therebetween in a horizontal direction.

3. The opening-closing apparatus as set forth the sections 1 or 2, which further comprises a plate holding device capable of holding a plate for the sliding nozzle device, wherein the hand-like distal module is detachably held by the plate holding device.

4. The opening-closing apparatus as set forth in any one of the sections 1 to 3, wherein the plate holding device comprises: a plurality of holding portions for holding the hand-like distal module; a widening and narrowing means to selectively widening and narrowing a distance between opposed ones of the plurality of holding portions; and a pressing portion for pressing the hand-like distal module when the hand-like distal module is held by the plurality of holding portions.

5. The opening-closing apparatus as set forth in any one of the sections 1 to 4, which further comprises a control unit configured to control operation of the robot arm, wherein the control unit is operable to controllably operate the robot arm so as to: move the hand-like distal module toward the openable-closable component of the sliding nozzle device and engage the hand-like distal module with the openable-closable component of the sliding nozzle device; then move the hand-like distal module to move the openable-closable component, if an absolute value of the force detected by the force sensor is equal to or less than a given threshold; and stop the movement of the hand-like distal module, when the absolute value of the force detected by the force sensor reaches the given threshold.

Effect of Invention

The present invention makes it possible to selectively open and close the openable-closable component of the sliding nozzle device to respective given positions in a reliable manner.

DESCRIPTION OF EMBODIMENTS

Figure 1:
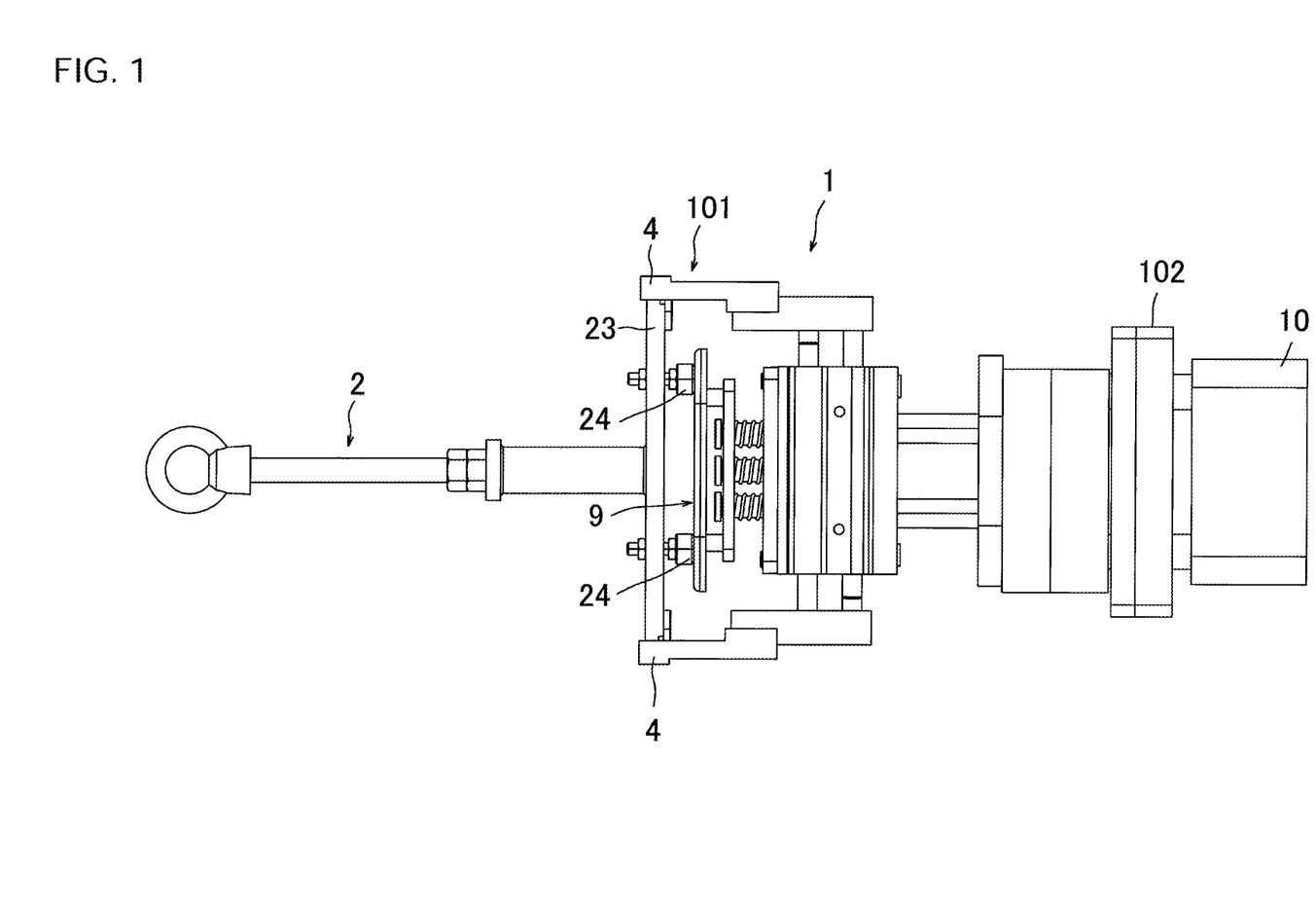
FIG. 1 is a side view of a main part of an opening-closing apparatus according to one embodiment of the present invention.
Figure 5:
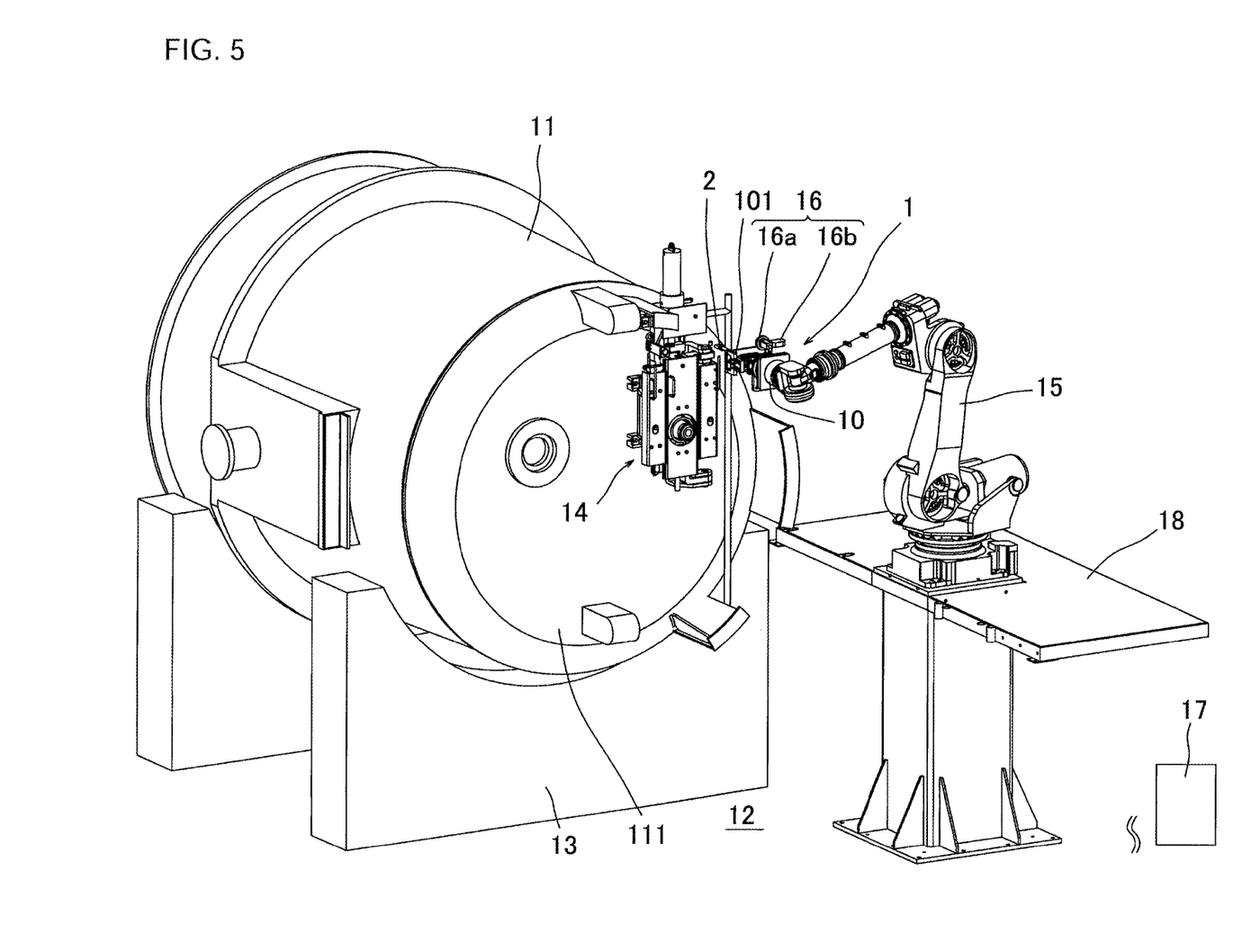
FIG. 5 is a diagram showing the overall configuration of the opening-closing apparatus according to this embodiment.

An opening-closing apparatus 1 according to one embodiment of the present invention comprises: a hand-like distal module 2; a plate holding device 101 detachably holding the hand-like distal module 2; and a force sensor 10 disposed on the side opposite to the hand-like distal module 2 with respect to the plate holding device 101, as shown in FIG. 1, wherein the opening-closing apparatus 1 is formed by mounting an assembly of these components to a robot arm 15, for example, as shown in FIG. 5.

Figure 2:
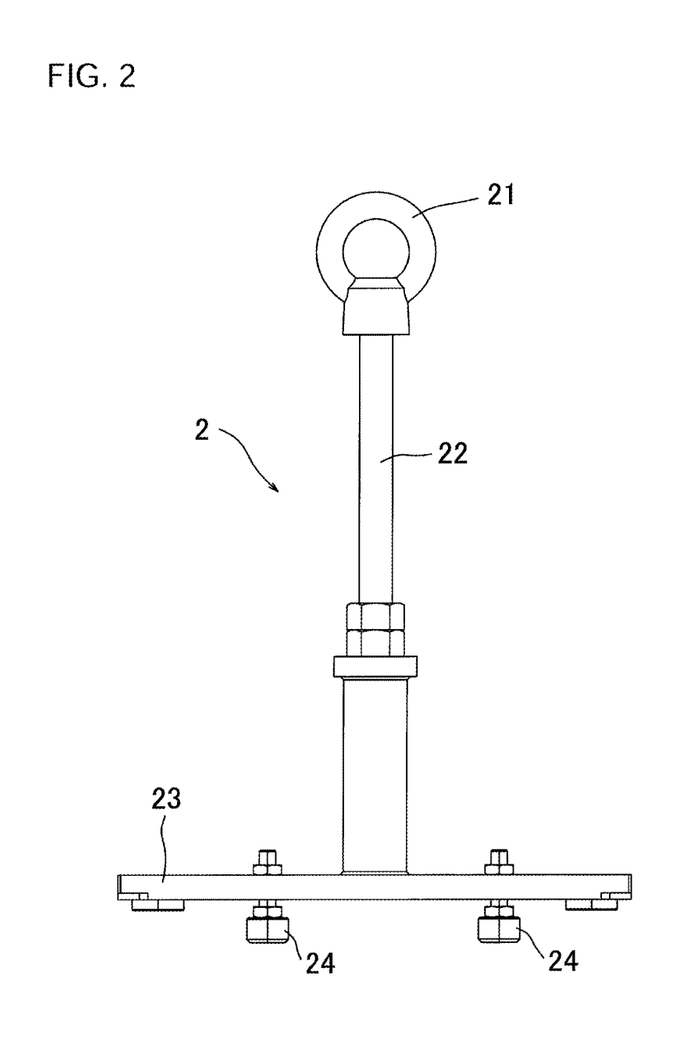
FIG. 2 is a plan view of a hand-like distal module in the part of the opening-closing apparatus illustrated in FIG. 1.
Figure 3:
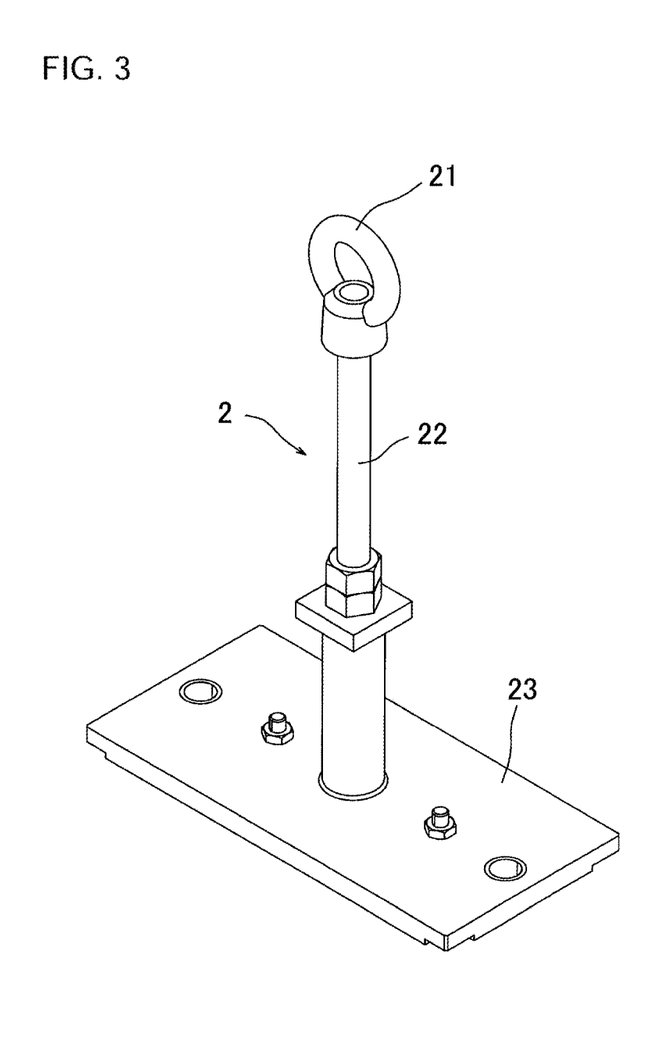
FIG. 3 is a perspective view of the hand-like distal module illustrated in FIG. 2.

As shown in FIGS. 2 and 3, the hand-like distal module 2 comprises: a ring 21 serving as an engagement portion; a retainer rod 22 holding the ring 21; and a base plate 23 having a central region to which the retainer rod 22 is fixed. The base plate 23 is composed of a rectangular-shaped metal plate, and provided with two protrusions 24 on a surface thereof opposite to the ring 21.

The plate holding device 101 is composed using the plate holding device disclosed in the Patent Document 1, and capable of detachably holding not only the hand-like distal module 2 of the opening-closing apparatus 1 according to this embodiment, but also a plate of a sliding nozzle device.

Figure 4:
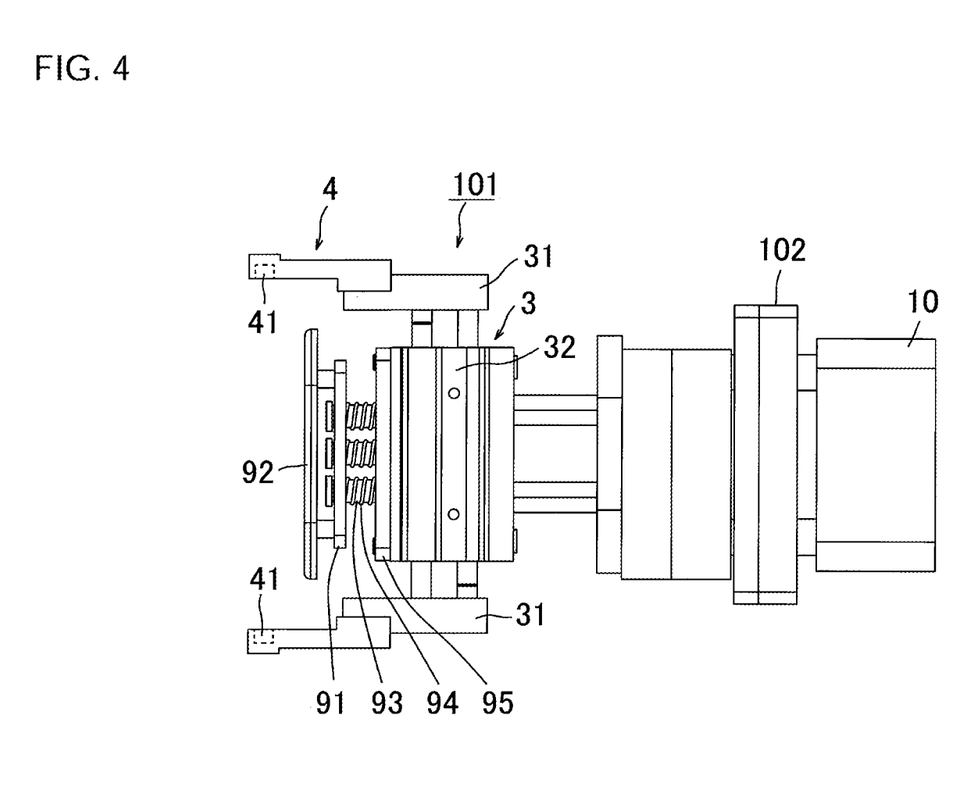
FIG. 4 is a side view of a plate holding device in the part of the opening-closing apparatus illustrated in FIG. 1.

As shown in FIG. 4, the force sensor 10 is assembled to the plate holding device 101 as the plate holding device disclosed in the Patent Document 1, on the side opposite to a pressing portion 9 with respect to a parallel gripper (parallel hand) 3 serving as a widening and narrowing means. More specifically, the plate holding device 101 comprises: a parallel gripper 3 serving as a widening and narrowing means; a pair of (two) holding portions 4 each attached to a respective one of parallel claws 31 of the parallel gripper 3; and a pressing portion 9 provided in front of a gripper body 32 of the parallel gripper 3, and the force sensor 10 is provided on the side opposite to the pressing portion 9 with respect to the parallel gripper 3. Further, each of the holding portions 4 has a respective one of two engagement grooves 41 formed at opposed positions to extend along respective distal edges of the holding portions 4.

It should be noted here that the widening and narrowing means is not limited to the parallel gripper 3. For example, a parallel chuck may be used. Alternatively, it may be composed using a hydraulic cylinder, an air cylinder or the like. Further, the widening and narrowing means is not necessarily limited to the configuration in which the pair of holding portions 4 are selectively widened and narrowed while maintaining a parallel relationship therebetween. For example, it may be configured such that a distance between the distal edges of the pair of holding portions 4 are selectively widened and narrowed by swinging movements of the pair of holding portions 4 about respective base ends (intersection point) thereof.

As shown in FIG. 1, this plate holding device 101 is configured to hold four corners of the base plate 23 of the hand-like distal module 2 by the holding portions 4, and simultaneously bring the pressing portion 9 into contact with the protrusions 24 of the base plate 23, thereby making it possible to reliably the hand-like distal module 2 without wobbling.

The pressing portion 9 comprises seven bolts 93, a support plate 91 having seven through-holes, seven coil springs 94, and a base plate 95, wherein each of the bolts is disposed to penetrate through a respective one of the through-holes of the support plate 91 and a respective one of the coil springs 94, and fixed to the base plate 95. The base plate 95 is attached to the gripper body 32 of the parallel gripper 3. The pressing portion 9 further comprises a pressing plate 92 fixed to the support plate 91, i.e., integrated with the support plate 91, with a gap therebetween. Thus, the pressing plate 92 can be moved toward the base plate 95 while compressing the coil springs 94. Here, a certain gap may be provided between each of the through-holes of the support plate 91 and a corresponding one of the bolts 93. In this case, the pressing plate 92 can be moved even when it is in a tilted state. The pressing plate 92 is set at a position where the coil springs 94 are compressed when the base plate 23 of the hand-like distal module 2 is held by the holding portions 4 (engagement grooves 41). Therefore, the base plate 23 of the hand-like distal module 2 held by the holding portions 4 is pressed against a region of an inner wall surface of each of the engagement grooves 41 on the far side with respect to the pressing portion 9.

The force sensor 10 is attached to a flange 102 on the side opposite to the pressing portion 9 with respect to the gripper body 32 of the parallel gripper 3 by bolts. That is, the force sensor 10 is a sensor configured to detect a force received from the hand-like distal module 2 by the holding portions 4 and/or the pressing portion 9. Such a force sensor to detect a force is also referred to as "haptic sensor", and a type of haptic sensor commonly used in robot arms or the like may be employed. In this embodiment, a six-axis force sensor is used as the force sensor 10.

Next, with reference to FIG. 5, the overall configuration and the usage state of the opening-closing apparatus according to this embodiment will be described. It should be noted that, in FIG. 5 and the after-mentioned FIGS. 6 to 8, the plate holding device 101 integrated with the force censor 10 is shown in an appropriately simplified form.

In FIG. 5, a ladle 11 just after completion of casting is laid down on a ladle support 13 installed on a floor 12. A sliding nozzle device 14 is attached to the bottom 111 of this ladle, and, in the posture illustrated in FIG. 5, a sliding direction of a sliding plate thereof is approximately aligned with a vertical direction.

A base end of the robot arm 15 is fixed to a robot arm mount 18 installed on the floor 12, and a flange of the force sensor 10 integrated with the plate holding device 101 is mounted to a distal end of the robot arm 15 by bolts. Further, the hand-like distal module 2 is held by the plate holding device 101. Here, the force sensor 10 and the distal end of the robot arm 15 are connected in series, such that central axes thereof are aligned with each other. It should be understood that the force sensor 10 may be separated from the plate holding device 101 and provided on the side of (integrated with) the robot arm 15. In this case, the force sensor 10 and the distal end of the robot arm 15 are also connected in series, such that the central axes thereof are aligned with each other.

In this embodiment, the robot arm 15 is a 6-axis vertical articulated robot arm, and capable of freely changing the posture and position of the hand-like distal module 2 mounted to the distal end thereof.

A three-dimensional sensor 16 comprising a camera 16a and a laser irradiator 16b is attached around the distal end of the robot arm 15. An image acquired by the camera 16a is input to an image processing device, and, in the image processing device, three-dimensional positional coordinates are corrected by an image processing process. The resulting coordinate information is input to a control unit 17, so that the robot arm 15 is moved to move the plate holding device 101 to an openable-closable component of the sliding nozzle device 14. On the other hand, information detected by the force sensor 10 is continuously input in the control unit 17. Then, based on the information from the force sensor 10, etc., the control unit 17 controls movement of the hand-like distal module 2 via the robot arm 15.

Next, with reference to FIGS. 6 to 8, a method of, after completion of casting, opening a slide metal frame holding unit 143 as one openable-closable component of the sliding nozzle device 14 attached to the bottom 111 of the ladle 11 will be described.

Figure 6:
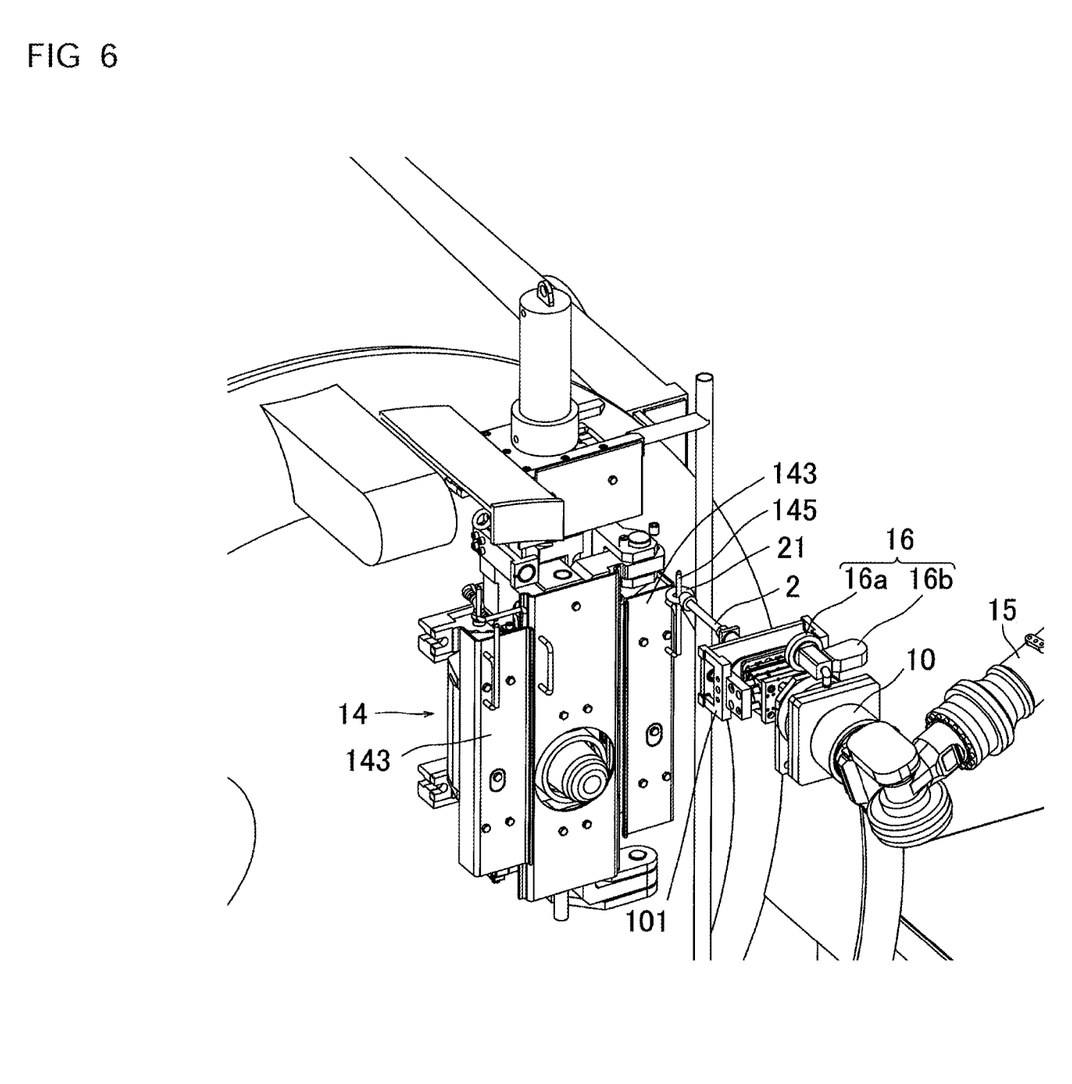
FIG. 6 is an explanatory diagram of the operation of the opening-closing apparatus illustrated in FIG. 5.

First of all, in FIG. 6, while the slide metal frame holding unit 143 of the sliding nozzle device 14 is irradiated with laser light from the laser irradiator 16b, an image of the slide metal frame holding unit 143 is acquired by the camera 16a and subjected to image processing, thereby computing a misalignment of the slide metal frame holding unit 143 with respect to a reference position and correcting three-dimensional positional coordinates of the slide metal frame holding unit 143. The corrected three-dimensional positional coordinates of the slide metal frame holding unit 143 is input to the control unit 17 (see FIG. 5; with regard to the control unit 17 in the following description, also see FIG. 5), so that the robot arm 15 is operated to move the hand-like distal module 2 mounted to the robot arm 15, to a position illustrated in FIG. 6.

In this embodiment, the slide metal frame holding unit 143 comprises an engagement rod 145 serving as a to-be-engaged portion for engagement with the hand-like distal module 2. The ring 21 of the hand-like distal module can be engaged with the engagement rod 145 in a state in which the ring 21 is freely fitted around the engagement rod 145 with a gap therebetween.

That is, the above position illustrated in FIG. 6 means a state in which the ring 21 of the hand-like distal module 2 is engaged with the engagement rod 145 of the slide metal frame holding unit 143. As above, the engagement rod 145 and the ring 21 are engaged with each other in the state in which the ring 21 is freely fitted around the engagement rod 145 with a gap therebetween in a horizontal direction. Thus, even when a certain amount of error arises in the three-dimensional positional coordinates of the slide metal frame holding unit 143, the engagement between the engagement rod 145 and the ring 21 can be achieved. In this embodiment, the outer diameter of the engagement rod 145 is set to 12 mm, and the inner diameter of the ring 21 is set to 40 mm, so that a gap to be formed therebetween in a horizontal direction is 14 mm on one side thereof. This gap may be determined depending on measurement accuracy of a position measurement device such as the aforementioned three-dimensional sensor 16. For example, it may be set in the range of 5 mm to 20 mm on one side thereof.

From the state illustrated in FIG. 6, the control unit 17 operates to controllably operate the robot arm 15 so as to start moving the hand-like distal module 2 in a direction causing the slide metal frame holding unit 143 to be opened. In this process, the hand-like distal module 2 receives a force in a tensile direction, and this force is detected by the force sensor 10. In this embodiment, the tensile force is detected as a negative value. Further, in this embodiment, if the absolute value of the tensile force is equal to or less than a given threshold, the hand-like distal module 2 is moved to open the slide metal frame holding unit 143.

Here, since the sliding nozzle device is used to control the flow rate of molten steel in a high-temperature environment, there can arise a situation where, due to seizure of the openable-closable component such as the slide metal frame holding unit 143 or adherence of molten steel and slag to the openable-closable component, a large force needs to or it becomes difficult to open the openable-closable component. In this situation, if the robot arm 15 is forcedly driven, the hand-like distal module 2, the plate holding device 101 or the robot arm 15 itself is likely to be damaged. In order to prevent such a damage, the hand-like distal module 2 is moved, if the absolute value of the force detected by the force sensor 10 is equal to or less than the given threshold.

With a view to detecting that the ring 21 of the hand-like distal module 2 fails to be engaged with the engagement rod 145 of the slide metal frame holding unit 143, a lower limit of the absolute value of a force to be detected by the force sensor 10 may be set. Specifically, when the absolute value of the force detected by the force sensor 10 during the movement of the hand-like distal module 2 is less than a give value (the above lower limit), it may be determined that the ring 21 of the hand-like distal module 2 fails to be engaged with the engagement rod 145 of the slide metal frame holding unit 143. In view of this, it can be said that, in this embodiment, the movement of the hand-like distal module 2 is performed if the absolute value of the force detected by the force sensor 10 falls within a given range (of the lower limit to the given threshold).

Figure 7:
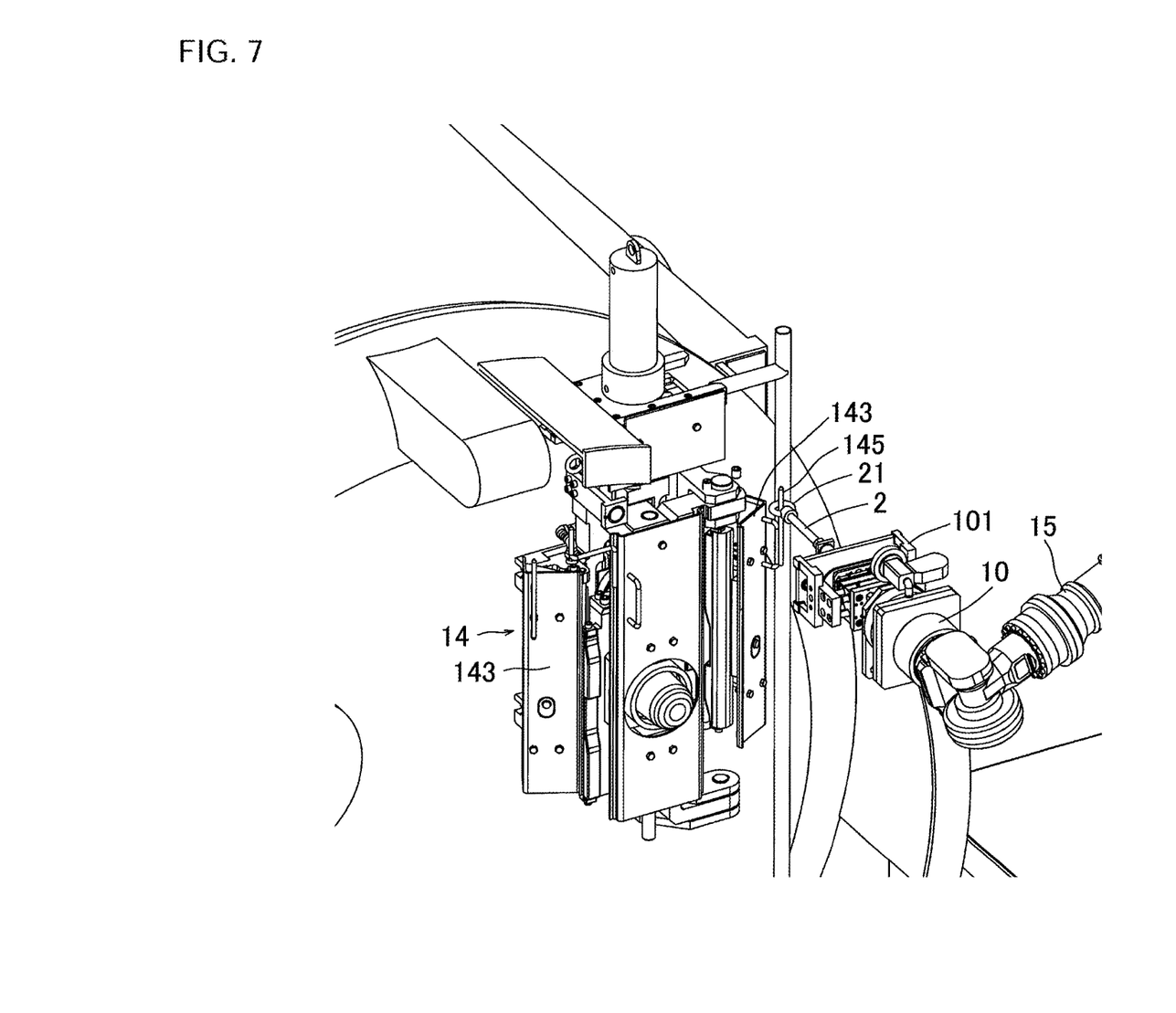
FIG. 7 is another explanatory diagram of the operation of the opening-closing apparatus illustrated in FIG. 5.
Figure 8:
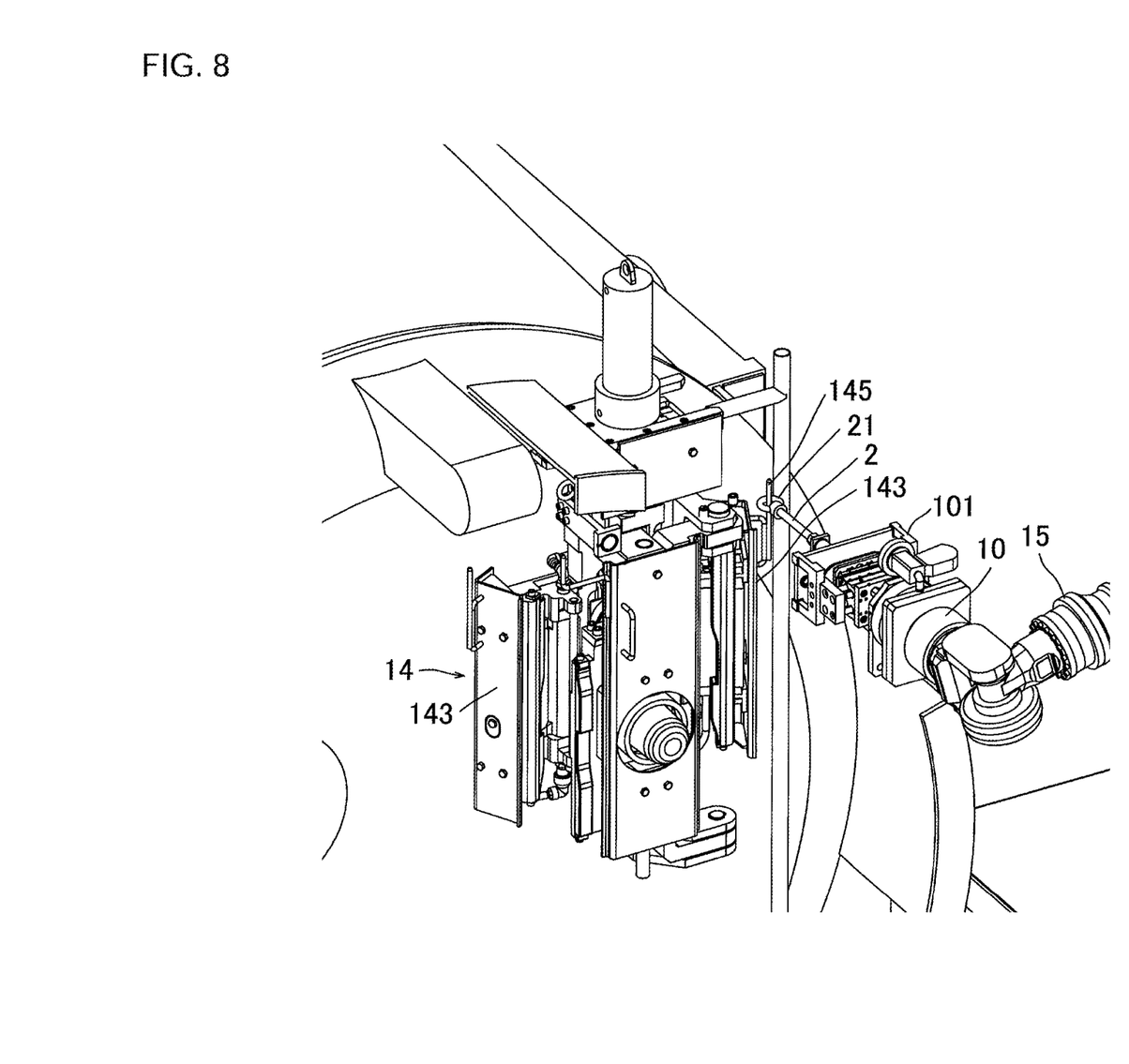
FIG. 8 is yet another explanatory diagram of the operation of the opening-closing apparatus illustrated in FIG. 5.

In the course of opening the slide metal frame holding unit 143, it takes the state illustrated in FIG. 7, and, when the slide metal frame holding unit 143 is fully opened, it reaches the state illustrated in FIG. 8. The state illustrated in FIG. 8 is a state in which the slide metal frame holding unit 143 cannot be opened any more, and the absolute value of the force detected by the force sensor 10 reaches the given threshold. In this embodiment, when the absolute value of the force detected by the force sensor 10 reaches the given threshold, the movement of the hand-like distal module 2 is stopped.

Here, although the three-dimensional positional coordinates of the slide metal frame holding unit 143 is measured by the three-dimensional sensor 16, an error is likely to arise in the positional coordinates for the aforementioned reason. Thus, if the robot arm 15 is driven under position control, the above error causes a situation where the slide metal frame holding unit 143 cannot be opened to a desired position, which leads to the occurrence of a problem in an operation of detaching a plate by the robot arm 15 in the next step. On the other hand, if the hand-like distal module 2 is further moved in the open direction despite the slide metal frame holding unit 143 has already been opened to the desired position, the hand-like distal module 2, the plate holding device 101 or the robot arm 15 is likely to be damaged. In order to prevent these problems, when the absolute value of the force detected by the force sensor 10 reaches the given threshold, the movement of the hand-like distal module 2 is stopped.

The slide metal frame holding unit 143 is located on each of both sides of a slide metal frame 142. In this embodiment, the two slide metal frame holding units 143 are coupled together via a link, i.e., has a mechanism configured such that, when one of the slide metal frame holding units 143 is opened or closed, the other slide metal frame holding units 143 is also opened or closed in an interlocking manner.

Next, an operation of closing the slide metal frame holding unit 143 will be described. This operation is a reverse process with respect to the operation of opening the slide metal frame holding unit 143, and thus the description will be started from the state illustrated in FIG. 8.

In FIG. 8, based on the three-dimensional positional coordinates of the slide metal frame holding unit 143 from the control unit 17, the robot arm 15 is controllably operated to move the hand-like distal module 2 and engage the ring 21 of the hand-like distal module 2 with the engagement rod 145 of the slide metal frame holding unit 143.

Subsequently, the hand-like distal module 2 is moved in a direction causing the slide metal frame holding unit 143 to be closed. In this process, the hand-like distal module 2 receives a force in a tensile direction, and this force is detected by the force sensor 10. In this embodiment, the tensile force is detected as a negative value, as mentioned above. Further, in this embodiment, if the absolute value of the tensile force is equal to or less than a given threshold, the hand-like distal module 2 is moved to close the slide metal frame holding unit 143. In the course of closing the slide metal frame holding unit 143, it takes the state illustrated in FIG. 7, and, when the slide metal frame holding unit 143 is fully closed, it reaches the state illustrated in FIG. 6. The state illustrated in FIG. 6 is a state in which the slide metal frame holding unit 143 cannot be closed any more, and the absolute value of the force detected by the force sensor 10 reaches the given threshold. In this embodiment, when the absolute value of the force detected by the force sensor 10 reaches the given threshold, the movement of the hand-like distal module 2 is stopped.

The above embodiment has been described based on an example where the engagement rod 145 is provided as the to-be-engaged portion of the openable-closable component of the sliding nozzle device, and the ring 21 is provided as the engagement portion of the hand-like distal module 2. Alternatively, the ring may be provided as the to-be-engaged portion of the openable-closable component of the sliding nozzle device, and the engagement rod may be provided as the engagement portion of the hand-like distal module 2. Further, respective shapes of the to-be-engaged portion and the engagement portion are not limited to a rod shape and a ring shape. In other words, these shapes may be any shapes as long as they allow the to-be-engaged portion of the openable-closable component of the sliding nozzle device and the engagement portion of the hand-like distal module 2 to be engaged (mated) with each other.

LIST OF REFERENCE SIGNS

1: opening-closing apparatus
101: plate holding device
102: flange
2: hand-like distal module
21: ring
22: retainer rod
23: base plate
24: protrusion
3: parallel gripper (widening and narrowing means)
31: parallel claw
32: gripper body
4: holding portion
41: engagement groove
9: pressing portion
91: support plate
92: pressing plate
93: bolt
94: coil spring
95: base plate
10: force sensor
11: ladle
111: bottom of ladle
12: floor
13: ladle support
14: sliding nozzle device
141: fixed metal frame
142: slide metal frame
143: slide metal frame holding unit
145: engagement rod
15: robot arm
16: three-dimensional sensor
16a: camera
16b: laser irradiator
17: control unit
18: robot arm mount

The invention claimed is:

1. An opening-closing apparatus for selectively opening and closing an openable-closable component of a sliding nozzle device, the opening-closing apparatus comprising:
    a positional sensor for determining determined three-dimensional positional coordinates of the openable-closable component of the sliding nozzle device;
    a distal module configured to be engaged with the openable-closable component of the sliding nozzle device based on the determined three-dimensional positional coordinates of the openable-closable component;
    a force sensor configured to detect a force received by the distal module; and
    a robot arm to which the distal module and the force sensor are coupled,
    wherein the distal module includes an engagement portion configured to be engaged with the openable-closable component of the sliding nozzle device, in a state in which the engagement portion of the distal module is freely fitted around a portion of the openable-closable component with a gap therebetween in a horizontal direction, and
    wherein the gap is sized to provide for engagement of the engagement portion with the openable-closable component of the sliding nozzle device even when there is an error in the determined three-dimensional positional coordinates of the openable-closable component.

2. The opening-closing apparatus as claimed in claim 1, wherein the distal module is detachably held by a plate holding device capable of holding a plate for the sliding nozzle device, wherein the plate holding device is mounted to the robot arm.

3. The opening-closing apparatus as claimed in claim 2, wherein the plate holding device comprises: a plurality of holding portions for holding the distal module; a widening and narrowing means to selectively widening and narrowing a distance between opposed ones of the plurality of holding portions; and a pressing portion for pressing the distal module when the distal module is held by the plurality of holding portions.

4. The opening-closing apparatus as claimed in claim 1, which further comprises a control unit configured to control operation of the robot arm, wherein the control unit is operable to controllably operate the robot arm so as to: move the distal module toward the openable-closable component of the sliding nozzle device and engage the distal module with the openable-closable component of the sliding nozzle device; then move the distal module to move the openable-closable component, if an absolute value of the force detected by the force sensor is equal to or less than a given threshold; and stop the movement of the distal module, when the absolute value of the force detected by the force sensor reaches the given threshold.

5. An opening-closing apparatus for selectively opening and closing an openable-closable component of a sliding nozzle device, the opening-closing apparatus comprising:
    a distal module configured to be engaged with the openable-closable component of the sliding nozzle device based on determined three-dimensional positional coordinates of the openable-closable component;
    a force sensor configured to detect a force received by the distal module; and
    a robot arm to which the distal module and the force sensor are coupled,
    wherein the distal module includes an engagement portion configured to be engaged with the openable-closable component of the sliding nozzle device, in a state in which the engagement portion of the distal module is freely fitted around a portion of the openable-closable component with a gap therebetween in a horizontal direction,
    wherein the gap is sized to provide for engagement of the engagement portion with the openable-closable component of the sliding nozzle device even when there is an error in the determined three-dimensional positional coordinates of the openable-closable component, and
    wherein a positional sensor is attached to the robot arm, the positional sensor determining the determined three-dimensional positional coordinates of the openable-closable component of the sliding nozzle device.

6. The opening-closing apparatus as claimed in claim 5, wherein the error is less than 20 nm.

* * * * *